(12) United States Patent
Smith

(10) Patent No.: US 12,168,341 B2
(45) Date of Patent: Dec. 17, 2024

(54) IONOMER INTERLAYER WITH ENHANCED ADHESION PROPERTIES

(71) Applicant: KURARAY AMERICA, INC., Houston, TX (US)

(72) Inventor: Charles Anthony Smith, Vienna, WV (US)

(73) Assignee: KURARAY AMERICA, INC., Houston, TX (US)

( * ) Notice: Subject to any disclaimer, the term of this patent is extended or adjusted under 35 U.S.C. 154(b) by 0 days.

(21) Appl. No.: 18/306,297

(22) Filed: Apr. 25, 2023

(65) Prior Publication Data

US 2023/0271409 A1   Aug. 31, 2023

Related U.S. Application Data

(63) Continuation of application No. 16/050,728, filed on Jul. 31, 2018, now Pat. No. 11,673,381.

(60) Provisional application No. 62/539,077, filed on Jul. 31, 2017.

(51) Int. Cl.
| | |
|---|---|
| C08L 23/08 | (2006.01) |
| B32B 7/12 | (2006.01) |
| B32B 17/10 | (2006.01) |
| B32B 27/32 | (2006.01) |
| B32B 27/36 | (2006.01) |
| C08J 3/22 | (2006.01) |
| C08K 5/544 | (2006.01) |

(52) U.S. Cl.
CPC ............. B32B 27/36 (2013.01); B32B 7/12 (2013.01); B32B 17/10036 (2013.01); B32B 17/1055 (2013.01); B32B 27/32 (2013.01); C08J 3/226 (2013.01); C08K 5/544 (2013.01); C08L 23/0876 (2013.01); *C08J 2323/08* (2013.01)

(58) Field of Classification Search
CPC .............. C08J 2323/08; C08J 2323/26
See application file for complete search history.

(56) References Cited

U.S. PATENT DOCUMENTS

| | | | |
|---|---|---|---|
| 3,909,487 A | 9/1975 | Waggoner | |
| 6,680,082 B2 | 1/2004 | Chou et al. | |
| 11,673,381 B2 * | 6/2023 | Smith | B32B 7/12 |
| | | | 428/441 |
| 2007/0122633 A1 | 5/2007 | Pesek et al. | |
| 2008/0199690 A1 | 8/2008 | Hayes et al. | |
| 2008/0302461 A1 | 12/2008 | Hayes et al. | |
| 2010/0233470 A1 | 9/2010 | Sasaki et al. | |
| 2011/0105681 A1 | 5/2011 | Nishijima | |
| 2011/0108094 A1 | 5/2011 | Nishijima | |
| 2012/0208940 A1 | 8/2012 | Shinya et al. | |
| 2013/0210186 A1 * | 8/2013 | Hiraike | B32B 3/30 |
| | | | 438/64 |
| 2014/0182664 A1 * | 7/2014 | Hayes | H01L 31/18 |
| | | | 156/60 |
| 2016/0229985 A1 | 8/2016 | Hansen et al. | |
| 2017/0136311 A1 * | 5/2017 | Binette | A63B 45/00 |

FOREIGN PATENT DOCUMENTS

| | | |
|---|---|---|
| CN | 102549061 A | 7/2012 |
| CN | 104125983 A | 10/2014 |
| JP | 2009-177089 A | 8/2009 |
| JP | 2009-248377 A | 10/2009 |
| JP | 2012-99803 A | 5/2012 |
| JP | 2014-58409 A | 4/2014 |
| JP | 2017-99864 | 6/2017 |
| KR | 10-2011-0019436 | 2/2011 |
| WO | WO 2012/066848 | 5/2012 |

OTHER PUBLICATIONS

International Search Report and Written Opinion issued Oct. 15, 2018 in PCT/US18/44299, 19 pages.
Extended European Search Report issued on Apr. 7, 2020, in Patent Application No. 18789311.0, 9 pages.
Japanese Office Action issued Jun. 7, 2022 in Japanese Patent Application No. 2020-505436, 7 pages.
Korean Office Action issued Jan. 9, 2023, in corresponding Korean Patent Application No. 10-2020-7002862 (w/English Language Translation).
Office Action issued Oct. 11, 1021, in China Patent Application No. 201880050246.6 (with English-language Translation).
Office Action issued Dec. 1, 2022, in Chinese Patent Application No. 201880050246.6 (with English-language Translation).
Office Action issued Jan. 10, 2023, in corresponding Japanese Patent Application No. 2020-505436 (with English-language Translation).
Office Action issued Jan. 17, 2019 in European Patent Application No. 18789311.0.
Office Action issued Jan. 21, 2019 in European Patent Application No. 18789311.0.
Chinese Office Action issued May 18, 2022 in Chinese Patent Application No. 201880050246.6 (with English translation), 19 pages.
European Office Action issued on Apr. 24, 2020, in Patent Application No. 18789311.0, 1 page.
European Office Action issued Jan. 18, 2022 in European Patent Application No. 18789311.0, 4 pages.
European Office Action received Dec. 9, 2020, in European Patent Patent Application No. 18 789 311.0.
European Office Action issued Sep. 8, 2023 in European Application 18789311.0, 7 pages.
Office Action issued May 28, 2024, in corresponding Japanese Patent Application No. 2023-077583 (with English Translation), 10 pages.

* cited by examiner

*Primary Examiner* — Margaret G Moore
(74) *Attorney, Agent, or Firm* — Oblon, McClelland, Maier & Neustadt, L.L.P.

(57) ABSTRACT

Provided is a sodium-neutralized ethylene acid copolymer ionomer composition containing a specified silane additive in a specified amount and having enhanced adhesion properties to glass, a masterbatch composition suitable for producing such ionomer composition, an interlayer made from such ionomer composition, and a glass laminate comprising such interlayer.

16 Claims, No Drawings

IONOMER INTERLAYER WITH ENHANCED ADHESION PROPERTIES

CROSS-REFERENCE TO RELATED APPLICATIONS

This application is a continuation application of prior U.S. application Ser. No. 16/050,728, and now U.S. Pat. No. 11,673,381, filed Jul. 31, 2018, the disclosure of which is incorporated herein by reference in its entirety. U.S. application Ser. No. 16/050,728 claims priority under 35 U.S.C. § 119 from U.S. Provisional Application Ser. No. 62/539,077 (filed 31 Jul. 2017), the disclosure of which is incorporated by reference herein for all purposes as if fully set forth.

FIELD OF THE INVENTION

The present invention relates to interlayers based on ethylene acid copolymer ionomer compositions having enhanced adhesion properties to glass, and to glass laminates comprising such interlayers.

BACKGROUND OF THE INVENTION

Laminated glass is generally made by laminating two pieces of glass onto a plastic interlayer. One particular advantage of laminated glass versus solid glass sheets is impact and shatter resistance due to adhesion of the glass to the interlayer sheet.

In safety glass laminates, optimal adhesion of the interlayer to glass is a balance. Too much adhesion detracts from the ability of the laminate to absorb and dissipate energy during an impact event, and too little adhesion can result in optical defects (at the time of lamination and subsequently), and can also detrimentally affect the ability of the interlayer to retain glass shards on impact.

Many different materials have been used as the plastic interlayer. For example, sheets containing a polyvinyl acetal (polyvinyl butyral) and a plasticizer are widely utilized as an interlayer for laminated glass because they have excellent adhesion-to-glass properties. Laminated glass containing such interlayers can be made with good transparency, mechanical strength, flexibility, acoustic damping and shatter resistance.

At least partially neutralized ethylene acid copolymers (ionomers) have also been used as interlayers for preparing laminated safety glass, for example, as disclosed in U.S. Pat. No. 3,404,134, U.S. Pat. Nos. 3,344,014, 7,445,683B2, 7,763,360B2, 7,951,865B1, 7,960,017B2, 8,399,097B2, 8,399,098B2, US2017/0320297A1 US2018/0117883A1, WO2016/076336A1, WO2016/076337A1, WO2016/076338A1 WO2016/076339A1 and WO2016/076340A1.

While ionomer resins can be chosen to produce interlayers having excellent flexural strength and optical properties, the adhesion properties to glass may not be optimal. In particular, because ionomers are neutralized acid copolymers, they do have a tendency to develop lamination defects, particularly in high moisture environments.

For example, when using ionomer resins as interlayers for float glass, adhesion is often satisfactory on the "tin side" but not on the "air side" of the glass, so special precautions need to be taken into account during the lamination process to properly orient such glass sheets to ensure contact of the "tin side" to the interlayer.

It has been proposed to use primers and other surface treatments of the glass and interlayer to help with the adhesion issue (see for example US2016/0159042A1), but this adds cost and complexity to the lamination process, and such surface treatments often result in too much adhesion which, as indicated previously, can detract from the ability of the laminate to absorb and dissipate energy during an impact event.

Ionomer resin modification and compounding with additives have also been attempted. For example, increasing the acid levels of the ethylene acid copolymers does improve the adhesion properties of the ultimate ionomer; however, there are practical and economic limits to how much the acid value can be increased. Additives have also been used with limited success.

In particular, silanes are known to be excellent adhesion promotors to glass in a number of different resin systems. As disclosed in US20110105681A1, however, the use of silanes in general with ionomers, and in particular with sodium-neutralized ionomers, creates gel and does not allow for the production of a melt stream allowing for completion of sheet extrusion in a satisfactory manner. That particular publication identified a narrow class of amino group-containing dialkoxysilanes that could be used in combination with only a specific type of zinc-neutralized ionomer.

In contrast to the teachings of US20110105681A1, it has now found that a certain class of silanes can successfully and advantageously be used in very specific amounts and under limited conditions as glass adhesion promotors for sodium-neutralized ionomers, allowing the optimal use of such ionomers in the preparation of interlayers and glass laminates having enhanced interlayer-to-glass adhesion properties.

SUMMARY OF THE INVENTION

The present invention addresses the above-described problem by providing a resin composition comprising an intimate mixture of (i) an ionomer resin and (ii) an adhesion promotor additive, wherein:
 (1) the ionomer resin is a sodium-neutralized ethylene-α,β-unsaturated carboxylic acid copolymer;
 (2) the adhesion promotor additive is a dialkoxysilane compound; and
 (3) the dialkoxysilane compound is present in the resin composition in an amount ranging from about 50 to about 5000 parts per million by weight based on the weight of the ionomer resin.

In one embodiment of the above resin composition, the dialkoxysilane compound is a liquid at ambient conditions. In another embodiment, the dialkoxysilane compound is substantially evenly distributed within the resin composition. In another embodiment, the resin composition is a particulate resin composition wherein the ionomer resin is a particulate ionomer resin, and the dialkoxysilane compound is predominantly (or substantially) present in the resin composition as imbibed on the surface of the ionomer resin particles.

In another aspect, the present invention provides a particulate masterbatch composition comprising (i) particles of an ionomer resin and (ii) an adhesion promotor additive, wherein:
 (1) the ionomer resin of the ionomer resin particles is a sodium-neutralized ethylene-α,β-unsaturated carboxylic acid copolymer;
 (2) the adhesion promotor additive is a dialkoxysilane compound;
 (3) the dialkoxysilane compound is present in the masterbatch composition in an amount ranging from about 1 to about 10 parts by weight based on 100 parts by weight of the ionomer resin; and (4) the dialkoxysilane compound is predominantly (or substantially) present in the masterbatch composition as imbibed on the surface of the ionomer resin particles.

In one embodiment of the above masterbatch composition, the dialkoxysilane compound is a liquid at ambient conditions. In another embodiment, the dialkoxysilane compound is substantially evenly distributed within the particulate masterbatch composition.

In another aspect, the present invention provides a first method of producing a resin composition, said method comprising the steps of:

(A) providing a masterbatch composition comprising (i) particles of an ionomer resin and (ii) an adhesion promotor additive, wherein:
  (1) the ionomer resin of the ionomer resin particles is a first sodium-neutralized ethylene-α,β-unsaturated carboxylic acid copolymer,
  (2) the adhesion promotor additive is a dialkoxysilane compound,
  (3) the dialkoxysilane compound is present in the masterbatch composition in an amount ranging from about 1 to about 10 parts by weight based on 100 parts by weight of the ionomer resin, and
  (4) the dialkoxysilane is predominantly (or substantially) present as imbibed on the surface of the ionomer resin particles; and (B) mixing the masterbatch composition with an amount of a second sodium-neutralized ethylene-α,β-unsaturated carboxylic acid copolymer to result in an intimate mixture with a concentration of said dialkoxysilane compound of from about 50 to about 5000 parts per million by weight based on the total weight of ionomer resin.

The first and second sodium-neutralized ethylene-α,β-unsaturated carboxylic acid copolymers can be the same or different.

In one embodiment of the above method, the dialkoxysilane compound is a liquid at ambient conditions. In another embodiment, the dialkoxysilane compound is substantially evenly distributed within the resin composition. In another embodiment, the mixing step is a melt blending step. In another embodiment, the second sodium-neutralized ethylene-α,β-unsaturated carboxylic acid copolymer is a particulate, the mixing step is performed under non-softening conditions for both the first and second sodium-neutralized ethylene-α,β-unsaturated carboxylic acid copolymers, and the resin composition is a particulate resin composition.

In another aspect, the present invention provides a method of producing a particulate resin composition, said method comprising the steps of:

(A) providing (i) particles of an ionomer resin having a surface and (ii) an adhesion promotor additive, wherein (1) the ionomer resin of the ionomer resin particles is a sodium-neutralized ethylene-α,β-unsaturated carboxylic acid copolymer, and (2) the adhesion promotor additive is a dialkoxysilane compound, and (B) physically mixing the particles with the adhesion promotor additive under non-softening conditions for the ionomer resin to produce particles having the dialkoxysilane compound predominantly (or substantially) present as imbibed on the surface of the ionomer resin particles;
wherein the dialkoxysilane compound is provided in an amount to result in a concentration in the resin composition of from about 50 to about 5000 parts per million by weight based on the total weight of ionomer resin.

In one embodiment of the above method, the dialkoxysilane compound is a liquid at ambient conditions. In another embodiment, the dialkoxysilane compound is substantially evenly distributed within the particulate resin composition.

In one embodiment of all of the above compositions and methods, the dialkoxysilane compound contains, in addition to two alkoxysilane groups, a carboxylic acid-reactive group. In one embodiment, the carboxylic acid-reactive group is an amino group or a glycidyl group.

In another aspect, the present invention provides a method of producing sheets of an ionomer resin by melt blending one of the above particulate resin compositions under shear to produce a melt blend, then extruding the melt blend through a die into a sheet form, then cooling the sheet form to solidify the resin. In one embodiment, the sheet has a top side and a bottom side, and the sheet is embossed with a pattern on one or both of the top and bottom sides prior to solidification.

In other aspects, the present invention provides an interlayer sheet of such resin composition, and a glass laminate made from such interlayer sheet, for example, comprising two sheets of glass having interposed between an interlayer in accordance with the present invention.

In one embodiment, the interlayer sheet comprises a layer comprising a sodium-neutralized ethylene-α,β-unsaturated carboxylic acid copolymer, wherein when the interlayer sheet is preconditioned at 34° C. and 50% relative humidity (as set forth in the examples), and the layer of the sodium-neutralized ethylene-α,β-unsaturated carboxylic acid copolymer is adhered to the air side of a float glass sheet having an air side and a tin side, the peel adhesion of the layer of the sodium-neutralized ethylene-α,β-unsaturated carboxylic acid copolymer adhered to the air side of the float glass sheet is at least about 20 N/cm (measured at 23° C. and 50% RH as set forth in the examples).

In another embodiment, the interlayer sheet comprises a layer comprising a sodium-neutralized ethylene-α,β-unsaturated carboxylic acid copolymer, wherein when the interlayer sheet is preconditioned at 34° C. and 50% relative humidity (as set forth in the examples), and the layer of the sodium-neutralized ethylene-α,β-unsaturated carboxylic acid copolymer is adhered to the air side of a float glass sheet having an air side and a tin side, the peel adhesion of the layer of the sodium-neutralized ethylene-α,β-unsaturated carboxylic acid copolymer adhered to the air side of the float glass sheet is at least about 0.5, or at least about 1 N/cm, under wet-state conditions (measured as set forth in the examples).

In another embodiment, the interlayer sheet comprises a layer comprising a sodium-neutralized ethylene-α,β-unsaturated carboxylic acid copolymer, wherein when the interlayer sheet is preconditioned at 34° C. and 50% relative humidity (as set forth in the examples), and the layer of the sodium-neutralized ethylene-α,β-unsaturated carboxylic acid copolymer is adhered to a float glass sheet having an air side and a tin side, the peel adhesion of the layer of the sodium-neutralized ethylene-α,β-unsaturated carboxylic acid copolymer when adhered to the air side of the float glass sheet (i) is greater than about 5 N/cm (measured at 23° C. and 50% RH as set forth in the examples), or is greater than about 10 N/cm (measured at 23° C. and 50% RH as set forth in the examples), and (ii) is greater than the peel adhesion when adhered to the tin side of the float glass sheet (measured at 23° C. and 50% RH as set forth in the examples).

These and other embodiments, features and advantages of the present invention will be more readily understood by those of ordinary skill in the art from a reading of the following detailed description.

DETAILED DESCRIPTION

The present invention relates to a resin composition, a masterbatch composition, a resin composition prepared using such masterbatch composition, an interlayer prepared from such resin composition, and a glass laminate containing such interlayer. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used, it is used to mean a certain effect or result can be obtained within a certain tolerance, and the skilled person knows how to obtain the tolerance. When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion" or "predominantly", as used herein, unless otherwise defined herein, means greater than 50% of the referenced material. If not specified, the percent is on a molar basis when reference is made to a molecule (such as hydrogen and ethylene), and otherwise is on a weight basis (such as for additive content).

The term "substantial portion" or "substantially", as used herein, unless otherwise defined, means all or almost all or the vast majority, as would be understood by the person of ordinary skill in the context used. It is intended to take into account some reasonable variance from 100% that would ordinarily occur in industrial-scale or commercial-scale situations.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The term "dipolymer" refers to polymers consisting essentially of two monomers, and the term "terpolymer" refers to polymers comprising at least three monomers.

The term "acid copolymer" as used herein refers to a copolymer comprising copolymerized units of an α-olefin, an α,β-ethylenically unsaturated carboxylic acid, and optionally other suitable comonomer(s) such as, for example, an α,β-ethylenically unsaturated carboxylic acid ester.

The term "(meth)acrylic", as used herein, alone or in combined form, such as "(meth)acrylate", refers to acrylic or methacrylic, for example, "acrylic acid or methacrylic acid", or "alkyl acrylate or alkyl methacrylate".

The term "ionomer" as used herein generally refers to a polymer that comprises ionic groups that are carboxylate salts, for example, ammonium carboxylates, alkali metal carboxylates, alkaline earth carboxylates, transition metal carboxylates and/or combinations of such carboxylates. Such polymers are generally produced by partially or fully neutralizing the carboxylic acid groups of precursor or parent polymers that are acid copolymers, as defined herein, for example by reaction with a base. The alkali metal ionomer as used herein is a sodium ionomer, for example a copolymer of ethylene and methacrylic acid, wherein all or a portion of the carboxylic acid groups of the copolymerized methacrylic acid units are neutralized, and substantially all of the neutralized carboxylic acid groups are in the form of sodium carboxylates.

For convenience, many elements of the present invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

DETAILED DESCRIPTION

Ionomer

In accordance with the present invention, the ionomer resin is a sodium-neutralized ethylene-α,β-unsaturated carboxylic acid copolymer, which includes resins having constituent units derived from ethylene, constituent units derived from an α,β-unsaturated carboxylic acid and optionally other constituent units as described below, in which at least a part of the constituent units derived from the α,β-unsaturated carboxylic acid are neutralized with a sodium ion.

In the ethylene-α,β-unsaturated carboxylic acid copolymer serving as a base polymer, a content proportion of the constituent units derived from an α,β-unsaturated carboxylic acid is typically 2% by mass or more, or 5% by mass or more (based on total copolymer mass). In addition, the content proportion of the constituent units derived from an α,β-unsaturated carboxylic acid is typically 30% by mass or less (based on total copolymer mass).

Examples of the α,β-unsaturated carboxylic acid constituting the ionomer include, without limitation, acrylic acid, methacrylic acid, itaconic acid, maleic acid, fumaric acid, and mixtures of two or more thereof. In one embodiment, the α,β-ethylenically unsaturated carboxylic acid is selected from acrylic acid, methacrylic acid, and mixtures thereof. In another embodiment, the α,β-ethylenically unsaturated carboxylic acid is methacrylic acid.

The ethylene acid copolymer may further comprise copolymerized units of one or more additional comonomer(s), such as an α,β-ethylenically unsaturated carboxylic acid ester. When present, alkyl esters having 3 to 10, or 3 to 8 carbons, are typically used. Specific examples of suitable esters of unsaturated carboxylic acids include, without limitation, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, dimethyl maleate, diethyl maleate, dibutyl maleate, dimethyl fumarate, diethyl fumarate, dibutyl fumarate, dimethyl fumarate, vinyl acetate, vinyl propionate, and mixtures of two or more thereof. In one embodiment, the additional comonomers are selected from methyl acrylate, methyl methacrylate, n-butyl acrylate, n-butyl methacrylate, isobutyl acrylate, isobutyl methacrylate, glycidyl methacrylate, vinyl acetate, and mixtures of two or more thereof. In another embodiment, the additional comonomer is one or more of n-butyl acrylate, n-butyl methacrylate, isobutyl acrylate and isobutyl methacrylate. In another embodiment, the additional comonomer is one or both of n-butyl acrylate and isobutyl acrylate.

Suitable ethylene acid copolymers have a melt flow rate (MFR) of from about 1, or from about 2, to about 4000 g/10 min, or to 1000 g/10 min, or to about 400 g/10 min, as determined in accordance with ASTM method D1238-89 at 190° C. and 2.16 kg.

Finally, suitable ethylene acid copolymers may be synthesized as described, for example, in U.S. Pat. Nos. 3,404,134, 5,028,674, 6,500,888B2, U.S. Pat. No. 6,518,365B1, U.S. Pat. No. 8,334,033B2 and U.S. Pat. No. 8,399,096B2. In one embodiment, a method described in U.S. Pat. No. 8,399,096B2 is used, and a sufficiently high level and complementary amount of the derivative of the second α,β-ethylenically unsaturated carboxylic acid is present in the reaction mixture.

To obtain the ionomers, the ethylene acid copolymers are partially neutralized by reaction with one or more bases. An example of a suitable procedure for neutralizing the ethylene acid copolymers is described in U.S. Pat. Nos. 3,404,134 and 6,518,365B1. After neutralization, about 1%, or about 10%, or about 15%, or about 20%, to about 90%, or to about 60%, or to about 55%, or to about 30%, of the hydrogen atoms of carboxylic acid groups present in the ethylene acid copolymer are replaced by other cations. Stated alternatively, about 1%, or about 10%, or about 15%, or about 20%, to about 90%, or to about 60%, or to about 55%, or to about 30%, of the total content of the carboxylic acid groups present in the ethylene acid copolymer are neutralized. In another alternative expression, the acid groups are neutralized to a level of about 1%, or about 10%, or about 15%, or about 20%, to about 90%, or to about 60%, or to about 55%, or to about 30%, based on the total content of carboxylic acid groups present in the ethylene acid copolymers as calculated or measured for the non-neutralized ethylene acid copolymers. The neutralization level can be tailored for the specific end-use.

The counterions to the carboxylate anions in the ionomer are sodium cations. While ionomers used in the present invention are sodium-neutralized ionomers, counterions other than sodium cations may be present in small amounts of less than 5 equivalent %, or less than 3 equivalent %, or less than 2 equivalent %, or less than 1 equivalent %, based on the total equivalents of carboxylate groups in the ionomer. In one embodiment, the counterions are substantially sodium ions.

Suitable cations other than sodium include any positively charged species that is stable under the conditions in which the ionomer composition is synthesized, processed and used. Suitable cations may be used in combinations of two or more. Typically, such other cations are metal cations, which may be monovalent, divalent, trivalent, or multivalent. Monovalent metal cations include but are not limited to cations of potassium, lithium, silver, mercury, copper, and the like. Divalent metal cations include but are not limited to cations of beryllium, magnesium, calcium, strontium, barium, copper, cadmium, mercury, tin, lead, iron, cobalt, nickel, zinc, and the like. Trivalent metal cations include but are not limited to cations of aluminum, scandium, iron, yttrium, and the like. Multivalent metal cations include but are not limited to cations of titanium, zirconium, hafnium, vanadium, tantalum, tungsten, chromium, cerium, iron, and the like. When the metal cation is multivalent, complexing agents such as stearate, oleate, salicylate, and phenolate radicals may be included, as described in U.S. Pat. No. 3,404,134. Typically, when present, the metal cations used are monovalent or divalent metal cations, such as lithium, magnesium, zinc, potassium, and combinations of one or more of these metal cations.

In one embodiment, counterions other than sodium are present in at most "contaminant" amounts, as one would typically find in industrial situations, as would be recognized by persons of ordinary skill in the relevant art.

The resulting sodium-neutralized ethylene acid copolymer has a melt index, as determined in accordance with ASTM method D1238-89 at 190° C. and 2.16 kg, that is lower than that of the corresponding ethylene acid copolymer. The ionomer's melt index depends on a number of factors, including the melt index of the ethylene acid copolymer, the amount of copolymerized acid, the neutralization level, the identity of the cation and its valency. Moreover, the desired value of the ionomer's melt index may be determined by its intended end use. Typically, however, the ionomer has a melt index of about 1000 g/10 min or less, or about 750 g/10 min or less, or about 500 g/10 min or less, or about 250 g/10 min or less, or about 100 g/10 min or less, or about 50 g/10 min or less, or about 25 g/10 min or less, or about of 20 g/10 min or less, or about 10 g/10 min or less, or about 7.5 g/10 min or less, as determined in accordance with ASTM method D1238-89 at 190° C. and 2.16 kg.

In one embodiment, the ionomer is an at least partially sodium-neutralized ethylene acid dipolymer comprising (consisting essentially of) copolymerized units of:
(i) ethylene, and
(ii) from about 10 wt %, or from about 15 wt %, or from about 18 wt %, or from about 20 wt %, to about 30 wt %, or to about 25 wt %, or to about 23 wt % or to about 22 wt %, of at least one $\alpha,\beta$-unsaturated carboxylic acid having 3 to 10 carbon atoms,
wherein the weight percentages of the copolymerized units are based on the total weight of the ethylene acid copolymer and the sum of the weight percentages of the copolymerized units is 100 wt %, and wherein at least a portion of carboxylic acid groups of the $\alpha,\beta$-unsaturated carboxylic acid are neutralized to form an ionomer comprising carboxylate groups having sodium counterions.

In one embodiment, the ionomer is an at least partially sodium-neutralized ethylene acid terpolymer comprising copolymerized units of:
(i) ethylene,
(ii) from about 10 wt %, or from about 15 wt %, or from about 18 wt %, or from about 20 wt %, to about 30 wt %, or to about 25 wt %, or to about 23 wt % or to about 22 wt %, of at least one $\alpha,\beta$-unsaturated carboxylic acid having 3 to 10 carbon atoms,
(iii) from about 2 wt %, or from about 3 wt %, or from about 4 wt %, or from about 5 wt %, to about 15 wt %, or to about 12 wt %, or to about 11 wt %, or to about 10 wt %, of at least one $\alpha,\beta$-unsaturated carboxylic acid ester having 3 to 10 carbon atoms, and
(iv) optionally a derivative of an $\alpha,\beta$-unsaturated carboxylic acid other than (iii) in an amount such that (iii)+(iv) is about 15 wt % or less, or about 12 wt % or less, or about 11 wt % or less,
wherein the weight percentages of the copolymerized units are based on the total weight of the ethylene acid copolymer and the sum of the weight percentages of the copolymerized units is 100 wt %, and wherein at least a portion of carboxylic acid groups of the $\alpha,\beta$-unsaturated carboxylic acid are neutralized to form an ionomer comprising carboxylate groups having sodium counterions.

Such terpolymer ionomers are generally disclosed in WO2015/199750A1, WO2014/100313A1 and US2017/0320297A1.

In one embodiment of the dipolymer or terpolymer as described above, the $\alpha,\beta$-unsaturated carboxylic acid is methacrylic acid.

In one embodiment of the terpolymer as described above, the $\alpha,\beta$-unsaturated carboxylic acid ester is n-butyl acrylate, isobutyl acrylate or a mixture thereof.

In one embodiment of the terpolymer described above, the copolymer consists essentially of copolymerized units of (i), (ii) and (iii).

Silanes

Silanes suitable for use in accordance with the present invention are dialkoxysilanes. Without being held to theory, it is believed that the hydrolyzed silanol portion of the silane can form an adhesive bond with the glass surface (silanols), thereby enhancing the adhesive force at the interface between the polymer and glass surface. The remaining portion of the silane molecule should then 'anchor' in some fashion and to some degree, with the surrounding ionomer resin 'matrix'. One way to achieve this is to choose functional groups which would interact in a favorable manner to allow the silane to either bond, chemically or through ionic or hydrogen bonding or sufficient van der Waals forces, or be of a size and shape that sterically, can "bridge" between the interlayer and glass surface, thereby increasing the adhesion over the same interlayer without the advantageous silane additive.

In one embodiment, each of the alkoxy groups individually contains from 1 to 3 carbon atoms. Suitable examples include diethoxydimethylsilane, diethoxyl(methyl)vinylsilane, 1,3-diethoxy-1,1,3,3-tetramethyldisiloxane, dimethoxydimethylsilane, dimethoxylmethylvinylsilane, methyldiethoxysilane, diisopropyldimethoxysilane, dicyclopentyldimethoxysilane, γ-aminopropyl-N-cyclohexylmethyldimethoxysilane, 3-aminopropylmethyldimethoxysilane, N-phenyl-3-aminopropylmethyldimethoxysilane, N-phenyl- 3-aminopropylmethyldiethoxysilane, N-β-(aminoethyl)-γ-aminopropylmethyldimethoxysilane and 3-glycidoxypropylmethyldiethoxysilane.

In another embodiment, in addition to the alkoxy groups the silane also contains an "active" chemical group for bonding into the ionomer resin matrix, for example, a carboxylic acid-reactive group such as an amino group or a glycidyl group. Suitable examples include γ-aminopropyl-N-cyclohexylmethyldimethoxysilane, 3-aminopropylmethyldimethoxysilane, N-phenyl-3-aminopropylmethyldimethoxysilane, N-phenyl-3-aminopropylmethyldiethoxysilane, N-β-(aminoethyl)-γ-aminopropylmethyldimethoxysilane and 3-glycidoxypropylmethyldiethoxysilane.

Desirably the silane is a liquid under ambient conditions (for example, at 20° C.). Specific such examples include N-β-(aminoethyl)-γ-aminopropylmethyldimethoxysilane (CAS #3069-29-2) and 3-glycidoxypropylmethyldiethoxysilane (CAS #2897-60-1).

Additional Adhesion Modifiers

In addition to the use of the silanes, it is also possible to further control the adhesion of the interlayer to glass or the like, if desired.

For example, reactive functional group-containing olefinic polymers wherein the functional group is at least one group selected from a carboxyl group and a derivative group of a carboxyl group (herein below, referred to as carboxylic group) (herein below, referred to as a carboxylic group-containing olefinic polymer) can also be used as adhesion modifiers. Suitable carboxylic group-containing olefinic polymers are disclosed, for example, in U.S. Pat. No. 7,989,083B2.

Although a critical minimum level of adhesion is necessary to maintain sufficient laminate integrity (e.g. preventing delamination defects) and sufficient retention of glass in a post-fractured state, optimization or adjustment of the impact performance of the resulting laminate can be made by intent. Though an optimal addition amount of the adhesion modifier (cumulative) varies with the additive to be used and the resin to be adhesion modified, it is preferably adjusted in such a manner that an adhesive force of the resulting laminate to a glass is generally adjusted to about 3 or more and about 10 or less in a pummel test (described in WO03/033583A1 or the like). In particular, in the case where high penetration resistance is required, the addition amount of the adhesion modifier is more preferably adjusted in such a manner that the adhesive force is about 3 or more and about 6 or less, whereas in the case where high glass shattering preventing properties are required, the addition amount of the adhesion modifier is more preferably adjusted in such a manner that the adhesive force is about 7 or more and about 10 or less.

Other Additives

Other than the aforementioned silanes and other adhesion modifiers, the resin composition and masterbatch of the present invention may contain one or more other additives including, for example, an antioxidant, an ultraviolet ray absorber, a photostabilizer, an antiblocking agent, a pigment, a dye, a heat shielding material (infrared ray absorber) and the like, or mixtures thereof. Such other additives are in a general sense well known to those of ordinary skill in the relevant art.

Examples of the antioxidant include phenol-based antioxidants, phosphorus-based antioxidants, sulfur-based antioxidants, and the like. Of those, phenol-based antioxidants are preferred, and alkyl-substituted phenol-based antioxidants are especially preferred.

Examples of the phenol-based antioxidant include acrylate-based compounds, such as 2-t-butyl-6-(3-t-butyl-2-hydroxy-5-methylbenzyl)-4-methylphenyl acrylate and 2,4-di-t-amyl-6-(1-(3,5-di-t-amyl-2-hydroxyphenyl)ethyl)phenyl acrylate; alkyl-substituted phenol-based compounds, such as 2,6-di-t-butyl-4-methylphenol, 2,6-di-t-butyl-4-ethylphenol, octadecyl-3-(3,5-di-t-butyl-4-hydroxyphenyl)propionate, 2,2'-methylene-bis(4-methyl-6-t-butylphenol), 4,4'-butylidene-bis(4-methyl-6-t-butylphenol), 4,4'-butylidene-bis(6-t-butyl-m-cresol), 4,4'-thiobis(3-methyl-6-t-butylphenol), bis(3-cyclohexyl-2-hydroxy-5-methylphenyl)methane, 3,9-bis(2-(3-(3-t-butyl-4-hydroxy-5-methylphenyl)propionyloxy)-1,1-dimethylethyl)-2,4,8,10-tetraoxaspiro[5.5]undecane, 1,1,3-trix(2-methyl-4-hydroxy-5-t-butylphenyl)butane, 1,3,5-trimethyl-2,4,6-tris(3,5-di-t-butyl-4-hydroxybenzyl)benzene, tetrakis(methylene-3-(3',5'-di-t-butyl-4'-hydroxyphenyl)propionate)methane and triethylene glycol bis (3-(3-t-butyl-4-hydroxy-5-methylphenyl)propionate); triazine group-containing phenol-based compounds, such as 1,3,5-tris(2,6-dimethyl-3-hydroxy-4-t-butylbenzyl)-1,3,5-triazine-2,4,6(1H,3H,5H)-trione, 6-(4-hydroxy-3,5-di-t-butylanilino)-2,4-bis-octylthio-1,3,5-triazine, 6-(4-hydroxy-3,5-dimethylanilino)-2,4-bis-octylthio-1,3,5-triazine, 6-(4-hydroxy-3-methyl-5-t-butylanilino)-2,4-bis-octylthio-1,3,5-triazine and 2-octylthio-4,6-bis-(3,5-di-t-butyl-4-oxyanilino)-1,3,5-triazine; and the like.

Examples of the phosphorus-based antioxidant include monophosphite-based compounds, such as triphenyl phosphite, diphenylisodecyl phosphite, phenyldiisodecyl phosphite, tris(nonylphenyl) phosphite, tris(dinonylphenyl) phosphite, tris(2-t-butyl-4-methylphenyl) phosphite, tris(2,4-di-t-butyl) phosphite, tris(cyclohexylphenyl) phosphite, 2,2-methylenebis(4,6-di-t-butylphenyl)octyl phosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide and 10-decyloxy-9,10-dihydro-9-oxa-10-phosphaphenanthrene; diphosphite-based compounds, such as 4,4'-butylidene-bis(3-methyl-6-t-butylphenyl-di-tridecylphosphite), 4,4'-isopropylidene-bis (phenyl-di-alkyl(C12-C15) phosphite), 4,4'-isopropylidene-bis(diphenylmonoalkyl(C12-C15)phosphite), 1,1,3-tris(2-methyl-4-di-tridecylphosphite-5-t-butylphenyl)butane and tetrakis(2,4-di-t-butylphenyl)-4,4'-biphenylene phosphite; and the like. Of those, monophosphite-based compounds are preferred.

Examples of the sulfur-based antioxidant include dilauryl 3,3'-thiodipropionate, distearyl 3,3-thiodipropionate, lauryl stearyl 3,3'-thiodipropionate, pentaerythritol-tetrakis-(β-lauryl-thiopropionate), 3,9-bis(2-dodecylthioethyl)-2,4,8,10-tetraoxaspiro[5.5]undecane, and the like.

These antioxidants can be used solely or in combination of two or more thereof. In the final resin composition, the antioxidant utilized is typically about 0.001 parts by weight or more, or about 0.01 parts by weight or more, based on 100 parts by weight of the ionomer resin. In addition, the amount of antioxidant utilized is typically about 5 parts by weight or less, or about 1 part by weight or less, based on 100 parts by weight of the ionomer resin.

Examples of the ultraviolet ray absorber include benzotriazole-based ultraviolet ray absorbers, such as 2-(5-methyl-2-hydroxyphenyl)benzotriazole, 2-[2-hydroxy-3,5-bis(α,α'-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-5-methyl-2-hydroxyphenyl)-5-chlorobenzotriazole and 2-(3,5-di-t-amyl-2-hydroxyphenyl)benzotriazole, 2-(2'-hydroxy-5'-t-octylphenyl)triazole; hindered amine-based ultraviolet ray absorbers, such as 2,2,6,6-tetramethyl-4-piperidyl benzoate, bis(2,2,6,6-tetramethyl-4-piperidyl)sebacate, bis(1,2,2,6,6-pentamethyl-4-piperidyl)-2-(3,5-di-t-butyl-4-hydroxybenzyl)-2-n-butylmalonate and 4-(3-(3,5-di-t-butyl-4-hydroxyphenyl)propionyloxy)-1-(2-(3-(3,5-di-t-butyl-4-hydroxyphenyl)propionyloxy)ethyl)-2,2,6,6-tetramethylpiperidine; benzoate-based ultraviolet ray absorbers, such as 2,4-di-t-butylphenyl-3,5-di-t-butyl-4-hydroxybenzoate and hexadecyl-3,5-di-t-butyl-4-hydroxybenzoate; and the like.

These ultraviolet ray absorbers can be used solely or in combination of two or more thereof. In the final resin composition, the amount of ultraviolet ray absorber utilized is typically about 10 ppm by weight or more, or about 100 ppm by weight or more, based on the weight of the ionomer resin. In addition, the amount of ultraviolet ray absorber utilized is typically about 50,000 ppm or less, or about 10,000 ppm or less, based on the weight of the ionomer resin.

In some embodiments, it is also possible to use two or more types of UV absorbers in combination.

In other embodiments, no UV absorber is added, or the laminate is substantially UV absorber additive free.

Examples of the photostabilizer include hindered amine-based materials, such as "ADEKA STAB LA-57" (a trade name) manufactured by Adeka Corporation, and "TINUVIN 622" (a trade name) manufactured by Ciba Specialty Chemicals Inc.

When a laminated glass is prepared by incorporating a heat-shielding fine particle or a heat-shielding compound as the heat-shielding material into the interlayer of the present invention to give a heat-shielding function to the laminate, a transmittance at a wavelength of 1,500 nm can be regulated to about 50% or less, or the TDS value (calculated from ISO 13837:2008) can be regulated to less than about 43%.

Examples of the heat-shielding fine particle include a metal-doped indium oxide, such as tin-doped indium oxide (ITO), a metal-doped tin oxide, such as antimony-doped tin oxide (ATO), a metal-doped zinc oxide, such as aluminum-doped zinc oxide (AZO), a metal element composite tungsten oxide represented by a general formula: $M_mWO_n$ (M represents a metal element; m is about 0.01 or more and about 1.0 or less; and n is about 2.2 or more and about 3.0 or less), zinc antimonate ($ZnSb_2O_5$), lanthanum hexaboride, and the like. Of those, ITO, ATO, and a metal element composite tungsten oxide are preferred, and a metal element composite tungsten oxide is more preferred. Examples of the metal element represented by M in the metal element composite tungsten oxide include Cs, Tl, Rb, Na, K, and the like, and in particular, Cs is preferred. From the viewpoint of heat shielding properties, m is preferably about 0.2 or more, or about 0.3 or more, and it is preferably about 0.5 or less, or about 0.4 or less.

From the viewpoint of transparency of the ultimate laminate, an average particle diameter of the heat shielding fine particle is preferably about 100 nm or less, or about 50 nm or less. It is to be noted that the average particle diameter of the heat shielding particle as referred to herein means one measured by a laser diffraction instrument.

In the final resin composition, a content of the heat shielding fine particle is preferably about 0.01% by weight or more, or about 0.05% by weight or more, or about 0.1% by weight or more, or about 0.2% by weight or more relative to the weight of the ionomer resin. In addition, the content of the heat shielding fine particle is preferably about 5% by weight or less, or about 3% by weight or less.

Examples of the heat shielding compound include phthalocyanine compounds, naphthalocyanine compounds, and the like. From the viewpoint of further improving the heat shielding properties, it is preferred that the heat shielding compound contains a metal. Examples of the metal include Na, K, Li, Cu, Zn, Fe, Co, Ni, Ru, Rh, Pd, Pt, Mn, Sn, V, Ca, Al, and the like, with Ni being especially preferred.

A content of the heat shielding compound is preferably about 0.001% by weight or more, or about 0.005% by weight or more, or about 0.01% by weight or more, based on the weight of the ionomer resin. In addition, the content of the heat shielding compound is preferably about 1% by weight or less, or about 0.5% by weight or less.

Production of Resin Compositions

The resin compositions of the present invention can be produced as melt blends by feeding the various compositions into an extruder and intimately mixing the components under melt conditions for the ionomer resins to produce a substantially uniform mixture that can ultimately be formed into the final shape, for example, by melt extrusion or molding.

As would be recognized by those of ordinary skill in the relevant art, in melt blending, attention must be given to insure mixing is intense enough to blend the silane into the monomer resin to a sufficient degree of uniformity. Generally this high degree of mixing via extrusion compounding is performed by creating enough shear and residence time in the extruder. Care must also be taken to avoid undesirable reactions, localized high concentrations of silane during compounding, decomposition of silane and polymeric resin due to high temperatures. Formation of discolored resin, gel or degraded product (e.g. black specks) can be avoided by choice of the correct process equipment and optimized process conditions.

For example, it is well understood that the extent of hydrolysis of the silane will be heightened with undue exposure to moisture and at extended time, perhaps requiring further consideration for controlling extraneous moisture contact. Blanketing with dry-air or nitrogen might be necessary, for example, to maintain a desired minimal degree of hydrolysis of the silane.

In one embodiment of the present invention, the resin composition is prepared by providing a masterbatch of a first ionomer resin with an elevated concentration of silane, which is then let down by addition to the same ionomer resin and/or a second ionomer resin to result in a composition of the desired silane end concentration.

In one embodiment of a masterbatch composition in accordance with the present invention, it is a particulate masterbatch composition comprising the silane additive imbibed on the surface of particles of an ionomer resin, wherein the dialkoxysilane compound is present in the masterbatch composition in an amount ranging from about 1, or from about 2.5, or from about 5, to about 10, or to about 8, parts by weight based on 100 parts by weight of the ionomer resin.

Desirably, the silane is a liquid, and this masterbatch composition can be prepared by physically mixing the ionomer resin particles and liquid silane under non-softening conditions for the ionomer resin, in other words, where the ionomer resin does not melt or soften to the extent that it significantly agglomerates or otherwise loses its original particulate form. In this case, the silane imbibes on the particle surface with minimal reaction or decomposition.

Suitably sized ionomer resin particles for preparing the masterbatch composition substantially range in size from about 0.1 mm, or from about 0.2 mm, to about 5 mm, or to about 4 mm, or to about 2 mm, or to about 1 mm. Such particles can be measured by an optical microscope with a stage micrometer. Particles up to 1 mm can be measured using a stage micrometer of 1 mm with divisions of 0.01 mm. Particles greater than 1 mm can be measured using a stage micrometer of 25 mm with divisions of 0.05 mm. For the diameter, or in the case of oblong or irregularly-shaped particles, the largest dimension of 20 particles randomly selected from the resin can be measured and the average of 20 particles used to characterize the general particle size.

In one embodiment, the particles for preparing the masterbatch are reduced from nominal pellet size, for example, by cryogenic grinding. For example, cryogenic grinding can be used to reduce the ionomer resin pellets from a nominal average particle size of about 4 mm diameter down to about average particle size ranging from about 0.1 mm to about 0.5 mm particle size. Reducing the particle size in this manner increases the particle surface area relative to the particle weight. Also, these particles are fractured during the milling process and are of irregular shape and this can further increase the surface area relative to particle weight as compared with nominally spherical ionomer resin pellet shapes. Cryogenic grinding processes are generally well known to those of ordinary skill in the relevant art, and typically involve the use of liquid nitrogen to chill pellets in advance of the grinding/milling process. Once cooled, the pellets proceed through a mechanical mill. The use of liquid nitrogen to chill the pellets enables more effective size reduction without undo heating and polymer degradation.

These ionomer resin particles can also be prepared by other conventions means, for example, via underwater melt cutting (for example, "micropellets" having an average diameter of about 0.5 to about 1.5 mm) or other methods well known to those of ordinary skill in the relevant art.

Alternatively, a particulate resin composition can be directly prepared by mixing the particulate ionomer resin and silane additive as above (imbibe the silane additive on the surface of the resin particles) but in amounts to result in the end concentration of components.

The silane additive is present final resin composition in an amount of from about 50, or from about 100, or from about 250, or from about 500, or from about 750, to about 5000, or to about 4000, or to about 2000, or to about 1500, or to about 1250, parts per million by weight based on the weight of the ionomer resin.

Additional additives if present can be mixed as part of the masterbatch, or can be added in the preparation of the final resin composition via conventional means as would be recognized by persons of ordinary skill in the relevant art.

Sheets/Interlayers

Sheets of the resin compositions of the present invention can be prepared by conventional melt extrusion or melt molding processes suitable for making interlayers for glass laminates. Such processes are well-known to those of ordinary skill in the relevant art, as exemplified by the previously incorporated publications.

The sheets can be monolayer or multilayer sheets. For example, multilayer sheets can be formed having a functional core layer sandwiched between two exterior layers and other optional interior layers. In one embodiment, at least one (or both) of the exterior layers of the multilayer interlayer is a sheet of the resin composition in accordance with the present invention.

As one example of a functional core layer can be mentioned an acoustic damping layer, such as a polystyrene copolymer intermediate film (see JP2007-91491A), a polyvinyl acetal layer (see US2013/0183507A1, U.S. Pat. No. 8,741,439B2, JP2012-214305A and U.S. Pat. No. 8,883,317B2), a viscoelastic acrylic layer (see U.S. Pat. No. 7,121,380B2), a layer containing a copolymer of styrene and a rubber-based resin monomer (see JP2009-256128A), a layer containing a polyolefin (see US2012/0204940A1), a layer containing an ethylene/vinyl acetate polymer (see WO2015/013242A1), a layer containing an ethylene acid copolymer (see WO2015/085165A1).

In one specific embodiment, the intermediate layer is thermoplastic elastomer resin, such as disclosed in WO2016/076336A1, WO2016/076337A1, WO2016/076338A1 WO2016/076339A1, WO2016/076340A1 and US2017/0320297A1. In a more specific embodiment, the thermoplastic elastomer resin is a hydrogenated product of a block copolymer having:

(i) an aromatic vinyl polymer block (a) containing about 60 mol % or more of an aromatic vinyl monomer unit, based on the aromatic vinyl polymer block, and (ii) an aliphatic unsaturated polymer block (b) containing about 60 mol % or more of a conjugated diene monomer unit, based on the aliphatic unsaturated polymer block, wherein the aliphatic unsaturated polymer block (b) contains about 50 mol % or more in total of an isoprene unit and a butadiene unit as the conjugated diene monomer unit, and wherein the amount of residual carbon-carbon double bonds the aliphatic unsaturated polymer block derived from conjugated diene monomer units is from about 2 to about 40 mol %.

Further, the interlayer as a whole can be symmetric having a substantially consistent thickness, or can be asymmetric wherein a portion of the interlayer has a thickness greater than another portion (for example, partial or full "wedge", as discussed in US2017/0320297A1 and US2018/0117883A1. Further, the laminate can be substantially clear or having coloring in all or a portion (for example, as discussed in US2017/0320297A1 and US2018/0117883A1.

In a symmetric construction, the interlayer should possess a total film thickness of about 320 μm or more, or about 420 μm or more. In addition, the total film thickness should be about 1250 μm or less, or about 1,000 μm or less.

In an asymmetric construction such as a wedge, the thinner portion of the interlayer should possess the thicknesses of a symmetric construction, while the thickness of the thick portion will depend on various parameters such as wedge angle. In one embodiment of a wedge-shaped interlayer, the thicker edge has a thickness of about 1850 μm or less, or about 1600 μm or less, or about 1520 μm or less, or about 1330 μm or less, or about 1140 μm or less; and the thinner edge has a thickness of about 600 μm or more, or about 700 μm or more, or about 760 μm or more.

In addition, a concave and convex structure, such as an embossing, can be formed on the surface of the interlayer of the present invention by conventionally known methods for assistance in deairing in laminate production. The shape of the embossing is not particularly limited, and those which are conventionally known can be adopted.

In one embodiment, at least one surface (and preferably both surfaces) of the interlayer for a laminated glass is shaped. By shaping at least one surface of the interlayer for a laminated glass, in the case where a laminated glass is produced, an air bubble present at an interface between the interlayer for a laminated glass and a glass easily escapes to the outside of the laminated glass, and thus, the appearance of the laminated glass can be made favorable. It is preferred to shape at least one surface of the interlayer for a laminated glass by an embossing roll method. By shaping the surface of the interlayer for a laminated glass, a concave portion and/or a convex portion are/is formed on the surface of the interlayer for a laminated glass.

An embossing roll to be used in the embossing roll method can be produced, for example, by using an engraving mill (mother mill) having a desired concave-convex pattern and transferring the concave-convex pattern to the surface of a metal roll. Further, an embossing roll can also be produced using laser etching. Further, after forming a fine concave-convex pattern on the surface of a metal roll as described above, the surface with the fine concave-convex pattern is subjected to a blast treatment using an abrasive material such as aluminum oxide, silicon oxide, or glass beads, whereby a finer concave-convex pattern can also be formed.

Further, the embossing roll to be used in the embossing roll method is preferably subjected to a release treatment. In the case where an embossing roll which is not subjected to a release treatment is used, it becomes difficult to release the interlayer for a laminated glass from the embossing roll. Examples of a method for the release treatment include known methods such as a silicone treatment, a Teflon (registered trademark) treatment, and a plasma treatment.

The depth of the concave portion and/or the height of the convex portion (hereinafter sometimes referred to as "the height of the embossed portion") of the surface of the interlayer for a laminated glass shaped by an embossing roll method or the like are/is typically about 5 µm or more, or about 10 µm or more, or about 20 µm or more. The height of the embossed portion is typically about 150 µm or less, or about 100 µm or less, or about 80 µm or less.

In the invention, the height of the embossed portion refers to a maximum height roughness (Rz) defined in JIS B 0601 (2001). The height of the embossed portion can be measured by, for example, utilizing the confocal principle of a laser microscope or the like. Incidentally, the height of the embossed portion, that is, the depth of the concave portion or the height of the convex portion may vary within a range that does not depart from the gist of the invention.

Examples of the form of the shape imparted by an embossing roll method or the like include a lattice, an oblique lattice, an oblique ellipse, an ellipse, an oblique groove, and a groove. The inclination angle of such form is typically from about 10° to about 80° with respect to the film flow direction (MD direction). Further, the shaping pattern may be a regular pattern or an irregular pattern such as a random matte pattern, or a pattern such as disclosed in U.S. Pat. No. 7,351,468B2.

The shaping by an embossing roll method or the like may be performed on one surface of the interlayer for a laminated glass, or may be performed on both surfaces, but is more typically performed on both surfaces.

Laminates

It is possible to produce laminates of the present invention by conventionally known methods. Examples thereof include using a vacuum laminator, using a vacuum bag, using a vacuum ring, using a nip roll, and the like. In addition, a method can be used in which, after temporary contact bonding, the resultant laminate is put into an autoclave for final bonding.

In the case of using a vacuum laminator, for example, a known instrument which is used for production of a solar cell can be used, and the assembly is laminated under a reduced pressure of about $1 \times 10^{-6}$ MPa or more and about $3 \times 10^{-2}$ MPa or less at a temperature of about 100° C. or higher, or about 130° C. or higher, and about 200° C. or lower, or about 170° C. or lower. The method of using a vacuum bag or a vacuum ring is, for example, described in EP1235683A1 (CA2388107A1) and, for example, the assembly is laminated under a pressure of about $2 \times 10^{-2}$ MPa at about 130° C. or higher and about 145° C. or lower.

In the case of using a nip roll, for example, there is exemplified a method in which after conducting first temporary contact bonding at a temperature of a flow starting temperature of the skin resin or lower, temporary contact bonding is further conducted under a condition close to the flow starting temperature. Specifically, for example, there is exemplified a method in which the assembly is heated at about 30° C. or higher and about 100° C. or lower by an infrared heater or the like, then deaerated by a roll, and further heated at about 50° C. or higher and about 150° C. or lower, followed by conducting contact bonding by a roll to achieve bonding or temporary bonding.

Though the autoclave process which is supplementarily conducted after the temporary contact bonding is variable depending upon the thickness or constitution of a module, it is, for example, carried out under a pressure of about 1 MPa or more and about 15 MPa or less at a temperature of about 120° C. or higher and about 160° C. or lower for about 0.5 hours or more and about 2 hours or less.

Well-known "no-autoclave" processes may alternatively be used to process laminates.

Advantageously, the glass to be used for preparing a laminated glass is not particularly limited. Inorganic glasses, such as a float sheet glass, a polished sheet glass, a figured glass, a wired sheet glass, a heat-ray absorbing glass, and conventionally known organic glasses, such as polymethyl methacrylate and polycarbonate, and the like can be used. These glasses may be any of colorless, colored, transparent, or non-transparent glasses. These glasses may be used solely, or may be used in combination of two or more thereof.

The laminated glass of the present invention can be suitably used for a windshield for automobile, a side glass for automobile, a sunroof for automobile, a rear glass for automobile, or a glass for head-up display; a building member for a window, a wall, a roof, a sunroof, a sound insulating wall, a display window, a balcony, a handrail wall, or the like; a partition glass member of a conference room; a solar panel; and the like. Further information on such uses can be found by reference to the previously incorporated publications.

The invention will be further understood from the following specific examples of the properties of the laminated glass. However, it will be understood that these examples are not to be construed as limiting the scope of the present invention in any manner.

EXAMPLES

The materials used in the examples are as follows.

The glass used in the Examples was soda-lime glass, standard annealed (obtained from Guardian Industries, Inc., Galax VA, USA).

Ionomer 1 (I1)—a partially neutralized ethylene acid dipolymer ionomer obtained from E.I. du Pont de Nemours & Co. (Wilmington, DE, USA) (21.7% methacrylic acid, Na 26% neutralized, MI=1.8 @190° C.).

Silane 1 (S1)—Gamma-glycidoxypropyltrimethoxysilane (Silquest® A-187, available from Momentive Performance Materials, Inc., Waterford, NY USA)

Silane 2 (S2)—3-glycidoxypropylmethyldiethoxysilane (CoatOSil® 2287, available from Momentive Performance Materials, Inc., Waterford, NY USA).

Silane 3 (S3)—N-(beta-aminoethyl)-gamma-aminopropymethyldimethoxysilane (Silquest® A-2120, available from Momentive Performance Materials, Inc., Waterford, NY USA).

Ionomer Sheet Preparation

For examples containing silane, the following approaches were utilized:

1200 grams of ionomer resin was weighed to the nearest 0.1 gram into a clean polypropylene plastic container (2 gallon capacity) with a large-mouth metal screw lid. The specific amount of liquid silane to yield the indicated concentration was pipetted into the container under proper ventilation and in line with proper laboratory safety practices. The container was then sealed with the lid and manually and thoroughly shaken for a period of 2 minutes to distribute the liquid over the mass of ionomer resin pellets. The mixture was shaken again after one hour from the initial preparation of the blend for a period of one minute and was shaken again for one minute prior to feeding the imbibed resin into the hopper of the feeder. The above operations were carried out under ambient temperature and humidity conditions (nominally 23C and 50% RH, but not in a controlled humidity environment). Within about 4 hours of preparation, the silane/resin blend was fed into the extruder via a calibrated auger type feeder as described in the ionomer sheet preparation method below.

Silane 1 (S1) was used to imbibe resin pellets of Examples CE-8 through CE-11. Silane 2 (S2) was used to imbibe resin pellets of Examples 1 through 13. Silane 3 (S3) was used to imbibe resin pellets of Examples 14 through 17.

The ionomer resin and silane additive (if present) were fed using a K-Tron feeder (Coperion GmbH) equipped with a calibrated pigtail type auger at about 5 to 7 lbs./hour into 18-mm diameter Liestritz twin-screw compounding extruder (screw speed set at 200 rpm) under the following temperature profiles provided in Table I and extruded into polymer strands (two 6-mm hole die).

TABLE I

| | Extruder Setpoints/Melt Temperature (° C.) | | | | |
|---|---|---|---|---|---|
| Heating Zones → Sections → Examples | 1 1 | 2 2 | 3, 4, 5 Section 'A' | 6, 7, 8, 9 Section 'B' & Die | Melt |
| CE-1 through CE-7 | 170 | 200 | 210 | 220 | 225 |
| CE-8 | 170 | 200 | 210 | 220 | 224 |
| CE-9 | 170 | 200 | 210 | 220 | 225 |
| CE-10 | 170 | 200 | 210 | 220 | 224 |
| CE-11 | 170 | 200 | 210 | 220 | 224 |
| CE-12 | 170 | 200 | 210 | 220 | 224 |
| EX-1 | 170 | 210 | 220 | 230 | 240 |
| EX-2 | 170 | 250 | 280 | 300 | 310 |
| EX-3 | 170 | 250 | 280 | 300 | 310 |
| EX-4 | 170 | 250 | 280 | 300 | 311 |
| EX-5 | 170 | 250 | 280 | 300 | 310 |
| EX-6 | 170 | 250 | 280 | 300 | 311 |
| EX-7 | 170 | 250 | 280 | 300 | 310 |
| EX-8 | 170 | 250 | 280 | 300 | 310 |
| EX-9 | 140 | 160 | 170 | 180 | 190 |
| EX-10 | 170 | 210 | 220 | 230 | 241 |
| EX-11 | 170 | 230 | 240 | 250 | 258 |
| EX-12 | 170 | 280 | 290 | 300 | 309 |
| EX-13 | 170 | 230 | 240 | 250 | 258 |
| EX-14 | 170 | 250 | 280 | 300 | 310 |
| EX-15 | 170 | 230 | 240 | 250 | 258 |
| EX-16 | 170 | 230 | 240 | 250 | 259 |
| EX-17 | 170 | 230 | 240 | 250 | 260 |
| EX-18 | 170 | 230 | 240 | 250 | 258 |

The polymer throughput was controlled by adjusting the screw speed to provide for a given throughput or residence time and resultant shear condition. In both extruder cases, the melt strand was drawn through a water batch containing ambient temperature demineralized water, the excess water was blown off with compressed air and the strand fed into a rotating cutter (Conair) resulting in chopped strand pellets. These pellets were then dried overnight in a vacuum oven at 50° C. with a slight dry nitrogen purge. The pellets were then compression molded into nominal 0.76 mm thick plaques measuring 150-mm by 200-mm. These plaques were then maintained in a dry atmosphere, or where indicated, exposed to differing humidity conditions prior to lamination as provided below.

Laminate Preparation Method

Glass laminates were prepared from each of the ionomer sheets by the following method. Annealed glass sheets (100×100×3 mm) were washed with a solution of trisodium phosphate (5 g/l) in de-ionized water at 50° C. for 5 min, then rinsed thoroughly with de-ionized water and dried. Three layers of each respective ionomer sheets (about 0.76 mm thick each) as listed in Table 1 were stacked together and placed between two lites of glass sheet (to yield an interlayer thickness of 2.28 mm).

The moisture level of the ionomer sheet was kept at or below 0.08% by weight by minimizing contact time to the room environment (about 35% RH) or was exposed for a period of 10 days (samples placed in an Espec Humidity chamber—Model LHU-113) at the temperature and humidity levels as indicated in the following examples.

The moisture level of the ionomer sheet was measured using a coulometric Karl Fischer method (Metrohm Model 800) with a heating chamber temperature of 150° C. for the sample vials. The ionomer sheeting was cut into small pieces to fit into the sample vials weighing a total of 0.40 grams.

The pre-lamination assembly was then taped together with a piece of polyester tape in a couple locations to maintain relative positioning of each layer with the glass lites. A nylon fabric strip was placed around the periphery of the assembly to facilitate air removal from within the layers. The assembly was placed inside a nylon vacuum bag, sealed and then a connection was made to a vacuum pump. A vacuum was applied to allow substantial removal of air from within (air pressure inside the bag was reduced to below 50 millibar absolute). The bagged assembly was then heated in a convection air oven to 120° C. and held for 30 min. A cooling fan was then used to cool the assembly down to near room temperature and the assembly was disconnected from the vacuum source and the bag removed yielding a fully pre-pressed assembly of glass and interlayer.

The assembly was then placed into an air autoclave and the temperature and pressure were increased from ambient to 135° C. at 13.8 bar over 15 min. This temperature and pressure was held for 30 min and then the temperature was decreased to 40° C. at a cooling of about 2.5° C./min whereby the pressure was then dropped back to ambient (over 15 min) and the final laminates were removed from the autoclave.

Haze Measurement

The laminates were thoroughly cleaned using WINDEX glass cleaner (S. C. Johnson & Son, Inc.) and lintless cloths and were inspected to ensure that they were free of bubbles and other defects which might otherwise interfere with making valid optical measurements. The laminates were then evaluated by means of a Haze-gard Plus hazemeter (Byk-Gardner) to obtain a measurement of percent haze. The measurement of haze followed the practice outlined in American National Standard (ANSI Z26.1-1966) "Safety Code for Safety Glazing Materials for Glazing Motor Vehicles Operating on Land Highways". Test section 5.17 and 5.18 along with FIGS. 5 and 6 in such standard detail the appropriate method and instrumental setup to measure the haze level of a glazing material. The Haze-gard Plus hazemeter meeting the proper criteria for this standard was used in all forthcoming measurements. Haze standards which are traceable to the National Bureau of Standards (now NIST) were used to ensure that the instrument was well-calibrated and operating properly.

Haze results are presented in Table II below:

TABLE II

| Example | Ionomer | Silane Additive | | Haze (%) |
|---|---|---|---|---|
| CE-1 | I1 | None | None | 0.55 |
| EX-1 | I1 | S2 | 1000 ppm | 0.62 |
| EX-2 | I1 | S2 | 3000 ppm | 0.81 |
| EX-3 | I1 | S3 | 1000 ppm | 0.63 |
| EX-4 | I1 | S3 | 4000 ppm | 0.85 |

As can be seen from the result, the addition of the silane added did not materially detrimentally impact the haze of the resulting laminate.

Peel Adhesion Measurement

To allow for measurement of peel adhesion, some samples were prepared as above with the following exceptions. Annealed glass was scribed, cut into 100 mm×200 mm rectangles and then washed per the procedure described earlier. Thin polyester tape (25 μm thickness×25 mm width) with silicone adhesive was applied to the glass surface on the 'side-of-interest' (air or tin-side) in two parallel strips providing a uniform 25 mm wide bonding area in between. This procedure allows for the creation of a very well defined bonding area without the need to cut through the polymer layer to create a peel strip as is conventionally performed in standard peel adhesion methodologies. Over top of the interlayer specimen, a thin 4-mil sheet of FEP film was placed over the plastic sheeting prior to placing the second piece of glass on top to provide a relatively flat surface for the lamination step and to act as a release layer for removal of the top piece of glass. All lamination steps were then carried out as stated above. Afterwards, 90 degree angle peel adhesion measurements were made on a variety of samples produced by the process above via a mechanical testing device (INSTRON Model 1122, Instron Industrial Products, Norwood, MA USA). The peels were conducted at a crosshead speed of 1-cm/min. rate under standard laboratory conditions (nominal 23° C. and 50% RH). After peeling approximately 100-mm of the sample, demineralized water was applied to the glass and peel interface, so that the interface was now fully immersed into liquid water. The peel rate was then reduced to 0.25-mm/min. and the test was allowed to continue for several hours until approximately another 100-mm of the sample was tested. Sufficient water was present to insure the sample was maintained in the 'wet' state during this final testing period. The data was collected via the computer software (INSTRON Bluehill III software, Instron Industrial Products, Norwood, MA USA) and an average force level was computed for the "50% RH" and the "wet-state" peel test sections.

The results are presented in Table III below.

TABLE II

| | | Silane Additive | | Sample | Peel Adhesion (N/cm) | | | |
| | | | | | 50% RH Environment | | Wet-State | |
| Example | Ionomer | Type | Amount | Preconditioning | Air-side | Tin-side | Air-side | Tin-side |
|---|---|---|---|---|---|---|---|---|
| CE-1 | I1 | None | — | As-prepared (0.08% moisture) | 8.61 | 13.15 | 0.09 | 0.16 |
| CE-12 | I1 | S1 | 1000 ppm | As-prepared | 21.68 | 16.92 | 0.06 | 0.10 |
| EX-1 | I1 | S2 | 600 ppm | As-prepared | 49.19 | 30.83 | 0.36 | 0.59 |
| EX-2 | I1 | S2 | 1000 ppm | As-prepared | 47.73 | 32.87 | 1.51 | 0.57 |
| EX-3 | I1 | S2 | 1500 ppm | As-prepared | 53.75 | 35.71 | 1.96 | 0.66 |
| EX-4 | I1 | S2 | 2000 ppm | As-prepared | 57.42 | 47.20 | 1.19 | 0.54 |
| EX-5 | I1 | S2 | 3000 ppm | As-prepared | 56.44 | 33.39 | 1.57 | 0.45 |
| EX-6 | I1 | S2 | 4000 ppm | As-prepared | 40.25 | 24.5 | 1.54 | 0.47 |
| EX-10 | I1 | S2@230° C. | 1000 ppm | As-prepared | 41.52 | 29.64 | 1.44 | 0.71 |
| EX-11 | I1 | S2@250° C. | 1000 ppm | As-prepared | 61.01 | 37.56 | 1.73 | 0.50 |
| EX-12 | I1 | S2@300° C. | 1000 ppm | As-prepared | 42.02 | 28.42 | 0.69 | 0.57 |
| EX-13 | I1 | S3 | 1000 ppm | As-prepared | 51.64 | 39.08 | 1.77 | 0.70 |
| CE-2 | I1 | None | — | Very dry (0.02% moisture) | 21.03 | 25.41 | 0.14 | 0.24 |
| CE-5 | I1 | None | | RT/27% RH | 7.35 | 11.38 | 0.05 | 0.08 |
| CE-6 | I1 | None | | RT/50% RH | 2.98 | 6.13 | 0.03 | 0.04 |
| CE-7 | I1 | None | | RT/75% RH | Delam. | Delam. | N/a | N/a |
| EX-14 | I1 | S2 | 1000 ppm | RT/75% RH | 18.13 | 2.86 | 0.50 | 0.11 |
| CE-3 | I1 | None | — | 34° C./50% RH | 4.64 | 7.08 | 0.05 | 0.11 |
| CE-8 | I1 | S1 | 1000 ppm | 34° C./50% RH | 3.68 | 7.38 | 0.01 | 0.09 |
| CE-9 | I1 | S1 | 2000 ppm | 34° C./50% RH | 4.65 | 4.41 | 0.05 | 0.10 |
| CE-10 | I1 | S1 | 3000 ppm | 34° C./50% RH | 2.66 | 5.25 | 0.01 | 0.03 |
| CE-11 | I1 | S1 | 4000 ppm | 34° C./50% RH | 4.38 | 5.08 | 0.05 | 0.02 |
| EX-7 | I1 | S2 | 1000 ppm | 34° C./50% RH | 42.24 | 20.08 | 2.14 | 0.52 |
| EX-9 | I1 | S2@180° C. | 1000 ppm | 34° C./50% RH | 43.19 | 20.94 | 1.24 | 1.22 |
| EX-15 | I1 | S3 | 1000 ppm | 34° C./50% RH | 20.16 | 19.15 | 2.33 | 0.85 |

TABLE II-continued

| | | Silane Additive | | Sample | Peel Adhesion (N/cm) | | | |
| | | | | | 50% RH Environment | | Wet-State | |
| Example | Ionomer | Type | Amount | Preconditioning | Air-side | Tin-side | Air-side | Tin-side |
| --- | --- | --- | --- | --- | --- | --- | --- | --- |
| EX-16 | I1 | S3 | 2000 ppm | 34° C./50% RH | n/a | 20.83 | 5.15 | 0.83 |
| EX-17 | I1 | S3 | 3000 ppm | 34° C./50% RH | 54.25 | 21.33 | 4.00 | 0.34 |
| EX-18 | I1 | S3 | 4000 ppm | 34° C./50% RH | 38.50 | 20.01 | 4.58 | 0.65 |
| CE-4 | I1 | None | — | 34° C./75% RH | 2.28 | 3.68 | 0.02 | 0.06 |
| EX-8 | I1 | S2 | 1000 ppm | 34° C./75% RH | 11.28 | 6.07 | 0.22 | 0.18 |

I claim:

1. A resin composition comprising an intimate mixture of (i) an ionomer resin and (ii) an adhesion promotor additive, wherein:
    (a) the ionomer resin is a sodium-neutralized ethylene·α,β-unsaturated carboxylic acid copolymer, wherein the sodium-neutralized ethylene·α,β-unsaturated carboxylic acid copolymer comprises constituent units derived from ethylene and constituent units derived from an α,β-unsaturated carboxylic acid, in which at least a part of the constituent units derived from the α,β-unsaturated carboxylic acid are neutralized with a counterion, and wherein the counterion consists essentially of sodium cations;
    (b) the adhesion promotor additive is a glycidyldialkoxysilane compound; and
    (c) the glycidyldialkoxysilane compound is present in the resin composition in an amount ranging from about 50 to about 250 parts per million by weight based on the weight of the ionomer resin;
    wherein
    a content of the α,β-unsaturated carboxylic acid in the ionomer resin is from 2 to 30% by mass, and
    a degree of neutralization of the α,β-unsaturated carboxylic acid in the ionomer resin is from 10 to 60%.

2. The resin composition of claim 1, wherein each of the alkoxy groups of the glycidyldialkoxysilane compound individually contains from 1 to 3 carbon atoms.

3. The resin composition of claim 1, wherein the glycidyldialkoxysilane compound is 3-glycidoxypropylmethyldiethoxysilane.

4. The resin composition of claim 1, wherein the glycidyldialkoxysilane compound is substantially evenly distributed within the resin composition.

5. The resin composition of claim 1, wherein the resin composition is a particulate resin composition wherein the ionomer resin is a particulate ionomer resin, and the glycidyldialkoxysilane compound is predominantly present in the resin composition as imbibed on the surface of the ionomer resin particles.

6. The resin composition of claim 1, wherein the sodium-neutralized ethylene·α,β-unsaturated carboxylic acid copolymer is a dipolymer consisting essentially of copolymerized units of:
    (i) ethylene, and
    (ii) from about 10 wt % to about 30 wt % of at least one α,β-unsaturated carboxylic acid having 3 to 10 carbon atoms,
    wherein the weight percentages of the copolymerized units are based on the total weight of the ethylene acid copolymer and the sum of the weight percentages of the copolymerized units is 100 wt %.

7. The resin composition of claim 1, wherein the sodium-neutralized ethylene·α,β-unsaturated carboxylic acid copolymer is a terpolymer consisting essentially of copolymerized units of:
    (i) ethylene,
    (ii) from about 10 wt % to about 30 wt % of at least one α,β-unsaturated carboxylic acid having 3 to 10 carbon atoms,
    (iii) from about 2 wt % to about 15 wt % of at least one α,β-unsaturated carboxylic acid ester having 3 to 10 carbon atoms, and
    (iv) optionally a derivative of an α,β-unsaturated carboxylic acid other than (iii) in an amount such that (iii)+(iv) is about 15 wt % or less,
    wherein the weight percentages of the copolymerized units are based on the total weight of the ethylene acid copolymer and the sum of the weight percentages of the copolymerized units is 100 wt %.

8. An interlayer sheet comprising a layer comprising a sodium-neutralized ethylene-α,β-unsaturated carboxylic acid copolymer composition according to claim 1, wherein when the interlayer sheet is preconditioned at 34° C. and 50% relative humidity, and the layer of the sodium-neutralized ethylene-α,β-unsaturated carboxylic acid copolymer composition is adhered to the air side of a float glass sheet having an air side and a tin side, the peel adhesion of the layer of the sodium-neutralized ethylene—unsaturated carboxylic acid copolymer composition adhered to the air side of the float glass sheet is at least about 20 N/cm when measured at 23° C. and 50% RH.

9. An interlayer sheet comprising a layer comprising a sodium-neutralized ethylene-α,β-unsaturated carboxylic acid copolymer composition according to claim 1, wherein when the interlayer sheet is preconditioned at 34° C. and 50% relative humidity, and the layer of the sodium-neutralized ethylene-α,β-unsaturated carboxylic acid copolymer composition is adhered to the air side of a float glass sheet having an air side and a tin side, the peel adhesion of the layer of the sodium-neutralized ethylene-α,β-unsaturated carboxylic acid copolymer composition adhered to the air side of the float glass sheet is at least about 0.5 N/cm (under wet-state conditions).

10. An interlayer sheet comprising a layer comprising a sodium-neutralized ethylene-α,β-unsaturated carboxylic acid copolymer composition according to claim 1, wherein when the interlayer sheet is preconditioned at 34° C. and 50% relative humidity, and the layer of the sodium-neutralized ethylene-α,β-unsaturated carboxylic acid copolymer composition is adhered to a float glass sheet having an air side and a tin side, the peel adhesion of the layer of the sodium-neutralized ethylene-α,β-unsaturated carboxylic acid copolymer composition when adhered to the air side of the float glass sheet (i) is greater than about 5 N/cm (measured at 23° C. and 50% RH), and (ii) is greater than the peel adhesion when adhered to the tin side of the float glass sheet (measured at 23° C. and 50% RH).

11. A particulate masterbatch composition comprising (i) particles of an ionomer resin and (ii) an adhesion promotor additive, wherein:
  (a) the ionomer resin of the ionomer resin particles is a sodium-neutralized ethylene·α,β-unsaturated carboxylic acid copolymer;
  (b) the adhesion promotor additive is a glycidyldialkoxysilane compound;
  (c) the glycidyldialkoxysilane compound is present in the masterbatch composition in an amount ranging from about 1 to about 10 parts by weight based on 100 parts by weight of the ionomer resin; and
  (d) the glycidyldialkoxysilane compound is predominantly present in the masterbatch composition as imbibed on the surface of the ionomer resin particles, and
  wherein
  a content of the α,β-unsaturated carboxylic acid in the ionomer resin is from 2 to 30% by mass, and
  a degree of neutralization of the α,β-unsaturated carboxylic acid in the ionomer resin is from 10 to 60%.

12. The masterbatch composition of claim 11, wherein each of the alkoxy groups of the glycidyldialkoxysilane compound individually contains from 1 to 3 carbon atoms.

13. The masterbatch composition of claim 11, wherein the glycidyldialkoxysilane compound is 3-glycidoxypropylmethyldiethoxysilane.

14. The masterbatch composition of claim 11, wherein the sodium-neutralized ethylene·α,β-unsaturated carboxylic acid copolymer is a dipolymer consisting essentially of copolymerized units of:
  (i) ethylene, and
  (ii) from about 10 wt % to about 30 wt % of at least one α,β-unsaturated carboxylic acid having 3 to 10 carbon atoms,
  wherein the weight percentages of the copolymerized units are based on the total weight of the ethylene acid copolymer and the sum of the weight percentages of the copolymerized units is 100 wt %, and wherein at least a portion of carboxylic acid groups of the α,β-unsaturated carboxylic acid are neutralized to form an ionomer comprising carboxylate groups having sodium counterions.

15. The masterbatch composition of claim 11, wherein the sodium-neutralized ethylene·α,β-unsaturated carboxylic acid copolymer is a terpolymer consisting essentially of copolymerized units of:
  (i) ethylene,
  (ii) from about 10 wt % to about 30 wt % of at least one α,β-unsaturated carboxylic acid having 3 to 10 carbon atoms,
  (iii) from about 2 wt % to about 15 wt % of at least one α,β-unsaturated carboxylic acid ester having 3 to 10 carbon atoms, and
  (iv) optionally a derivative of an α,β-unsaturated carboxylic acid other than (iii) in an amount such that (iii)+(iv) is about 15 wt % or less,
  wherein the weight percentages of the copolymerized units are based on the total weight of the ethylene acid copolymer and the sum of the weight percentages of the copolymerized units is 100 wt %, and wherein at least a portion of carboxylic acid groups of the α,β-unsaturated carboxylic acid are neutralized to form an ionomer comprising carboxylate groups having sodium counterions.

16. A method of producing a resin composition, comprising:
  (A) providing a masterbatch composition as set forth in claim 11; and
  (B) mixing the masterbatch composition with an amount of a second sodium-neutralized ethylene·α,β-unsaturated carboxylic acid copolymer to obtain an intimate mixture with a concentration of said glycidyldialkoxysilane compound of from about 50 to about 250 parts per million by weight based on the total weight of ionomer resin.

* * * * *